Jan. 11, 1966   O. A. KERSHNER   3,228,493
CAM ACTUATED SPOT BRAKE
Filed March 9, 1964
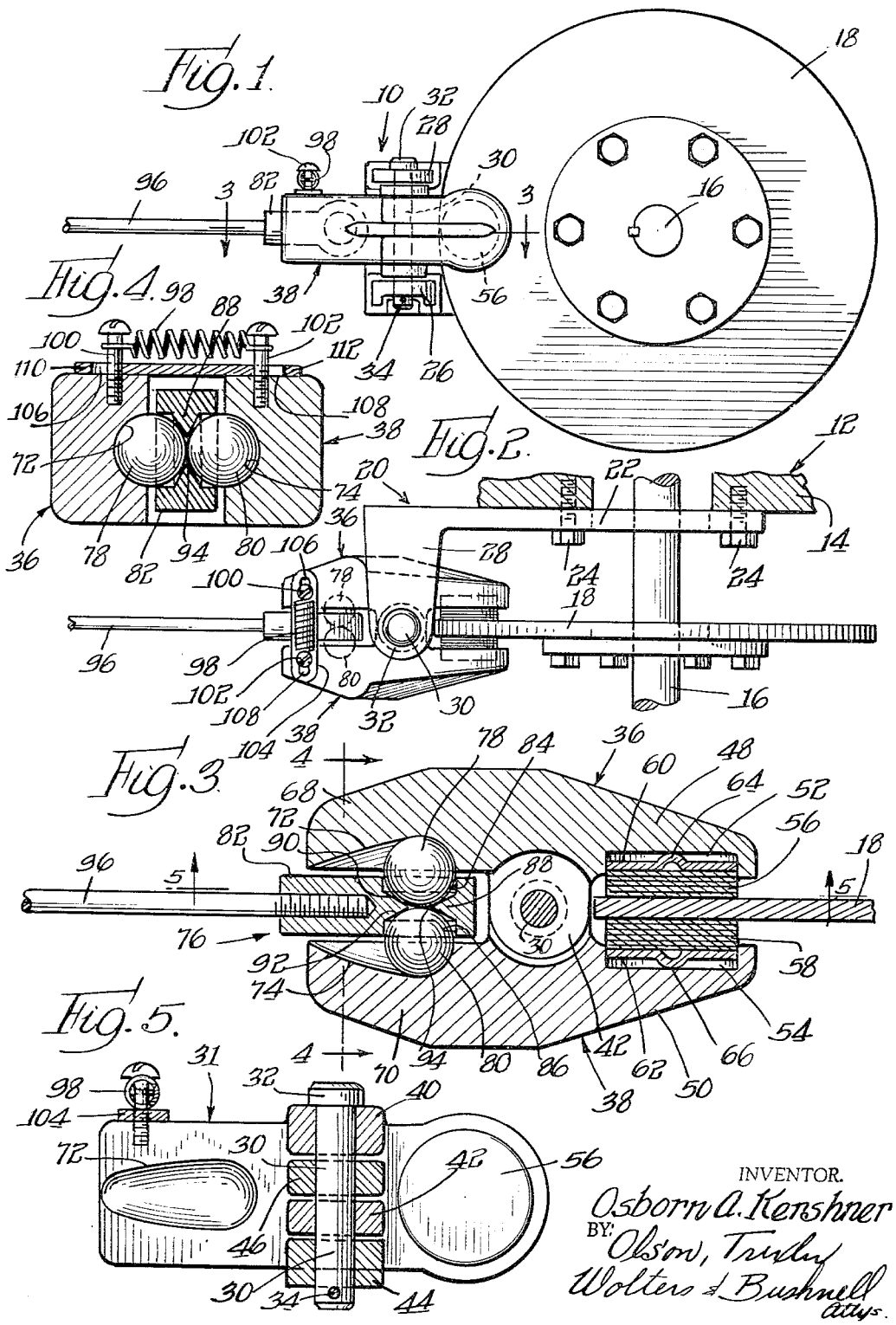
INVENTOR.
Osborn A. Kershner
BY: Olson, Trexler
Wolters & Bushnell
attys.

United States Patent Office 3,228,493
Patented Jan. 11, 1966

3,228,493
CAM ACTUATED SPOT BRAKE
Osborn A. Kershner, St. Joseph, Mich., assignor, by mesne assignments, to Lambert Brake Corporation, St. Joseph, Mich., a corporation of Michigan
Filed Mar. 9, 1964, Ser. No. 350,336
4 Claims. (Cl. 188—73)

The present invention relates to a novel brake structure, and more specifically to a novel spot brake structure.

An important object of the present invention is to provide a novel spot brake structure which is of relatively economical, compact and simplified construction.

A further important object of the present invention is to provide a novel spot brake structure which is more efficient in operation for enabling a desired braking action to be obtained with a reduced force applied by an operator with a pedal or other suitable manual means.

Still another important object of the present invention is to provide a novel spot brake construction having simplified and more efficient means for releasing the brake unit and returning the actuating mechanism therefor to normal or deenergized position.

Other objects and advantages of the present invention will become apparent from the following description and the accompanying drawings wherein:

FIG. 1 is a fragmentary elevational view showing a brake unit incorporating features of the present invention assembled with a vehicle or other apparatus having a rotary member to be controlled;

FIG. 2 is a plan view of the portion of the apparatus shown in FIG. 1;

FIG. 3 is an enlarged partial sectional view taken along line 3—3 in FIG. 1;

FIG. 4 is an enlarged sectional view taken along line 4—4 in FIG. 3; and

FIG. 5 is a sectional view taken generally along line 5—5 in FIG. 3.

Referring now more specifically to the drawings wherein like parts are designated by the same numerals throughout the various figures, a brake unit 10 incorporating features of the present invention is adapted to be assembled with a vehicle or apparatus 12 having a fixed frame 14 and a rotatable shaft 16 on which a disc 18 is mounted. It will be appreciated that the apparatus or vehicle may be of various known constructions. For example, the apparatus or vehicle 12 could be any of various known golf carts, go-carts, industrial carts and various types of industrial machines. In any event each of the vehicles or machines has a rotary part 16 to be controlled on which the disc 18 is fixed for rotation therewith and cooperation with the brake unit 10.

The brake unit 10 comprises a mounting bracket 20 having a base portion 22 which is secured to the frame 14 of the apparatus or vehicle by suitable means such as screws 24. The bracket further includes a pair of spaced apart parallel ears 26 and 28 projecting laterally from the base portion 22. As shown in FIGS. 1 and 2, outer ends of the ears are in close proximity to the peripheral edge of the disc 18 and have aligned apertures therethrough with a common axis disposed in a plane parallel to and bisecting the disc 18.

A pivot pin 30 is mounted in the aligned apertures in the bracket ears 26 and 28, which pin has an enlarged head 32 at one end thereof for preventing passage through the apertures in one direction. A cotter pin 34 is inserted through an aperture in an opposite end of the pivot pin 30 for retaining the pin is assembled relationship with the bracket.

The brake unit 10 further includes a pair of caliper or scissors like members 36 and 38 mounted on the pivot pin 30. The member 36 has laterally projecting spaced apart apertured ears 40 and 42 receiving the pin 30 and the member 38 has corresponding ears 44 and 46 interleaved with the ears 40 and 42 and pivotally receiving the pin 30. It will be observed that the members 36 and 38 are thus mounted for pivotal movement about an axis positioned substantially as close as possible to the peripheral edge of the disc 18 and in a plane parallel to and bisecting the disc 18.

The caliper members 36 and 38 respectively have first end portions 48 and 50 extending from the pivot ears 40–46 along opposite sides of and in spaced relationship to the disc 18. These end portions have circular seats 52 and 54 formed therein for receiving discs or pads 56 and 58 of a suitable friction material. The discs 56 and 58 are preferably secured or bonded to metal backing plates or discs 60 and 62 having centrally located rounded projections or bearing elements 64 and 66. The rounded projections 64 and 66 enable the friction discs 56 and 58 to pivot or tilt sufficiently within the seats 52 and 54 so that the outer flat surfaces of the friction discs will be parallel to and urge uniformly against the flat parallel opposite side surfaces of the rotatable disc 18 regardless of the amount which the caliper members 36 and 38 may be pivoted or tilted with respect to the rotatable disc. It is to be noted that the seats 52 and 54 are located substantially immediately adjacent the pivot ears 40–46 of the caliper members so as to reduce the effective length of the lever arm between the friction pads and the pivotal axis of the caliper members substantially as much as possible for promoting a more aggressive braking action when the brake unit is operated in the manner described below.

The caliper members 36 and 38 respectively have second end portions 68 and 70 extending oppositely from the end portions 48 and 50. Opposed cam surfaces 72 and 74 are formed on the inner sides of the end portions 68 and 70 and wedge means 76 is disposed between and in engagement with the cam surfaces for actuating the caliper members to provide a braking action. More specifically, the wedge means 76 comprises a pair of ball elements 78 and 80 retained in engagement with each other and the cam surfaces by a cage member 82. It will be observed that when the wedge means is shifted toward the left as viewed in FIG. 3 from the retracted or deenergized position shown therein, the ball elements will ride up on the progressively higher portions of the cam surfaces 72 and 74 for spreading the end portions 68 and 70 of the caliper members and thereby force the friction pads 56 and 58 against the opposite sides of the rotatable disc 18 for obtaining a braking action.

As shown in FIGS. 3 and 4, the cage member has an elongated body adapted to extend between the end portions 68 and 70 of the caliper members, which body has circular bores 84 and 86 in opposite sides thereof for accommodating the ball elements 78 and 80. The bores are separated by a centrally located web 88 having opposite sides defined by conical ball seats 90 and 92 which intersect each other to provide a central reduced diameter aperture 94 through the web 88. This arrangement enables the ball elements to bear directly against each other for minimizing sliding friction between the parts during operation of the brake unit. At the same time the conical seats 90 and 92 tend to maintain the ball elements centrally within the bores 84 and 86 for minimizing frictional engagement of the balls with the cylindrical walls of the bores.

The cage member 82 is adapted to be connected to a link or cable 96 to which an actuating force may be applied for pulling the cable or element 96 toward the left as viewed in FIG. 3 and energizing the brake structure. It will be appreciated that the element 96 may be connected to any suitable linkage mechanism, foot pedal, lever, or fluid pressure or other actuating means. Thus such actuating means need not be shown or described in detail herein.

In order to release the brake unit when the actuating force applied to the element 96 is relieved, a tension spring 98 is connected between pins 100 and 102 secured to the end portions 68 and 70 of the caliper members. It is to be noted that the pins 100 and 102 are located toward the extreme ends of the caliper end portions 68 and 70 and at a side of the ball elements opposite from the pivotal axis of the caliper members. This arrangement significantly increases the efficiency of the spring 98 as means for pivoting the caliper members toward open or retracted positions and forcing the cam means toward its retracted position. In fact it has been found that the spring element 98 will effectively release the brake unit and return the cam means 76 and the actuating element 96 to the retracted position whereby the conventional spring connected with a brake pedal, not shown, may be eliminated.

The friction pads 56 and 58 are initially provided with a considerable thickness as shown best in FIG. 3. However, as the brake is repeatedly used, the friction pads will be worn away so as to require greater pivotal movement on the part of the caliper members for accomplishing the braking action. As the friction pads wear away, it is necessary to pull the wedge means farther toward the left as viewed in FIG. 3 for accomplishing the braking action. A link 104 extends between the pins 100 and 102 for limiting the movement of the caliper end portions 68 and 70 away from each other thereby preventing the cam means from being pulled completely out from between the cam surfaces when the friction pads become substantially worn out. The link 104 is provided with elongated slots 106 and 108 in opposite ends thereof for receiving the pins 100 and 102 and permitting a limited amount of relative movement between the caliper members. Opposite ends 110 and 112 of the slots are spaced from each other so as to act as stop surfaces engageable with the pins 100 and 102 for preventing the end of the caliper members from spreading too far apart.

While a preferred embodiment of the present invention has been shown and described herein, it is obvious that many details may be changed without departing from the spirit and scope of the appended claims:

The invention is claimed as follows:

1. A brake unit for controlling a disc rotatable about a predetermined axis comprising a pair of caliper members pivotally interconnected for movement about an axis substantially immediately adjacent a peripheral edge of said disc and in a plane containing said first mentioned axis, said caliper members including first end portions extending along opposite sides of said disc, opposed friction means on said first end portions engageable with opposite sides of the disc when the brake unit is energized, said caliper members having second end portions extending in a direction oppositely from said first end portions, opposed cam surface means on said second end portions, wedge means between and engaging said cam surface means for pivoting said caliper members and urging said friction means against said disc upon actuation of said wedge means in said direction, pin elements respectively on and extending laterally from said caliper members, a link member extending between and connected with said pin elements, said link member having an elongated slot in at least one end thereof slidably receiving one of said pin elements, said link member including stop surfaces engageable with said pin elements for limiting movement of the caliper members with respect to each other in preventing the wedge means from being pulled completely out from between said cam surfaces, and spring means between said pin elements for urging said caliper members and said wedge means toward retracted positions.

2. A brake unit for controlling a disc rotatable about a predetermined axis comprising a pair of caliper members, said caliper members including interleaved ears having aligned apertures therethrough, means including a pin extending through said apertured ears supporting said caliper members for pivotal movement about a second axis substantially immediately adjacent a peripheral edge of said disc and in a plane containing said first mentioned axis, said caliper members including first end portions extending along opposite sides of said disc, opposed friction means on said first end portions substantially immediately adjacent said apertured ears and engageable with opposite sides of said disc when the brake unit is energized, said caliper members having second end portions extending in a direction oppositely from said first end portions, opposed cam surface means on said second end portions, wedge means including a cage member and a pair of ball elements in said cage member and engaging each other and said cam surfaces for pivoting said caliper members and urging said friction means against the disc upon actuation of the wedge means in said direction, pin elements secured to and projecting laterally from the ends of said second end portions outwardly of said wedge means, a tension spring connected between said pin elements for urging said caliper members and said wedge means toward retracted positions, and a link member extending between and connected with said pin elements, said link member having an elongated slot in at least one end thereof receiving one of said pin elements, said link member having stop means engageable with said pin elements for limiting movement of said second end portions away from each other for preventing said wedge means from being pulled completely out from between said cam surface means.

3. A brake unit, as defined in claim 2, wherein said means supporting said caliper means includes a bracket adapted to be mounted to a fixed support and comprising apertured ears projecting on opposite sides of said caliper members, said pin extending through said last mentioned ears, said pin having an enlarged head at one end thereof restraining movement thereof in one direction, and means detachably connected with an opposite end of said pin restraining movement of the pin in an opposite direction.

4. A brake unit, as defined in claim 2, wherein said cage member of said wedge means comprises a body member having aligned bores therein respectively receiving said ball elements, said body member including a central web portion separating said bores, opposite sides of said web portion being defined by conical seats for centering the ball elements within said bores, said conical seats intersecting each other and defining at said intersection an aperture through the web for permitting said ball elements to engage each other.

References Cited by the Examiner

UNITED STATES PATENTS

| | | | |
|---|---|---|---|
| 707,345 | 8/1902 | Neale | 188—73 |
| 2,827,132 | 3/1958 | Buyze | 188—73 |
| 2,856,792 | 10/1958 | Hess. | |
| 3,096,853 | 7/1963 | Farrand | 188—73 X |

FOREIGN PATENTS

| | | |
|---|---|---|
| Re. Add. 47,286 | 12/1936 | France. |
| 1,151,513 | 8/1957 | France. |
| 1,237,699 | 6/1960 | France. |
| 844,529 | 8/1960 | Great Britain. |

MILTON BUCHLER, *Primary Examiner*.

ARTHUR L. LA POINT, *Examiner*.